G. SINCLAIR.

Improvement in Trolling Hooks.

No. 123,844. Patented Feb. 20, 1872.

Witnesses:
E. Wolff.
Francis McArdle.

Inventor:
G. Sinclair
Per Munn & Co.
Attorneys.

123,844

UNITED STATES PATENT OFFICE.

GEORGE SINCLAIR, OF CHICAGO, ILLINOIS, ASSIGNOR TO HIMSELF AND CHARLES E. SINCLAIR, OF SAME PLACE.

IMPROVEMENT IN TROLLING-HOOKS.

Specification forming part of Letters Patent No. 123,844, dated February 20, 1872.

*To all whom it may concern:*

Be it known that I, GEORGE SINCLAIR, of Chicago, in the county of Cook and State of Illinois, have invented a new and useful Improvement in Trolling-Hooks; and I do hereby declare that the following is a full, clear, and exact description thereof, which will enable others skilled in the art to make and use the same, reference being had to the accompanying drawing forming part of this specification.

Figure 1:
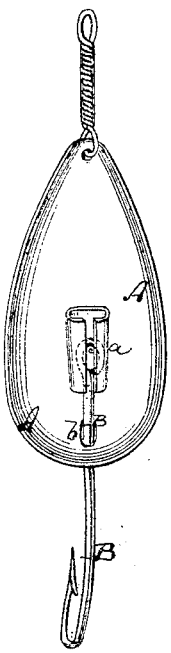
Figure 2:
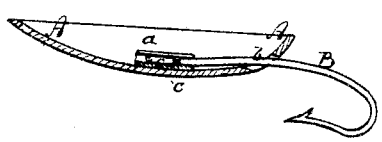
Figure 3:
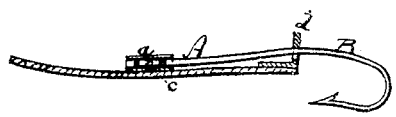

Figure 1 represents a top view of my improved trolling-hook. Fig. 2 is a longitudinal section of the same. Fig. 3 is a longitudinal section of a modification.

Similar letters of reference indicate corresponding parts.

This invention relates to a new method of attaching fish-hooks to spoons, propeller-wheels, and other styles of trolling-hooks; and consists in forming on the spoons or wheels wedge-shaped sockets, in which the eyes at the ends of the hooks are securely held.

The advantages of this mode of fastening are, first, that the hook can be removed when worn or useless and replaced without difficulty; and that, moreover, a stronger connection is obtained than by the ordinary method of soldering.

A in the drawing represents a spoon of the kind used on trolling-hooks. B is the hook. On the top of the spoon is secured, by suitable means, a bent plate, $a$, which forms a wedge-shaped socket, whose narrow end points toward the point of the spoon. The hook B has its shank fitted through an aperture, $b$, in front of the spoon and placed into the socket $a$, the eye $c$ at the end of the shank being drawn forward until it is securely wedged and held in the dovetail socket. The hook can readily be removed and replaced.

To wheels or other trolling-hooks which are not turned up in front to receive the aperture $b$ I propose to apply a projecting perforated ear, $d$, as in Fig. 3, which will answer the same purpose as said aperture.

Having thus described my invention, I claim as new and desire to secure by Letters Patent—

The combination of spoon A, having the wedge-formed socket-plate $a$ fast in the bottom thereof with the hook B, having eye $c$ and a shank passing through the aperture $b$ of the spoon, for the purpose of forming an improved trolling-hook.

GEORGE SINCLAIR.

Witnesses:
WALTER LLOYD,
RUSSEL B. EDGELL.